US009201962B2

(12) United States Patent
Carter (10) Patent No.: US 9,201,962 B2
(45) Date of Patent: Dec. 1, 2015

(54) TECHNIQUES FOR IDENTIFYING AND LINKING RELATED CONTENT (75) Inventor: Stephen R Carter, Spanish Fork, UT (US)

(73) Assignee: Novell, Inc., Provo, UT (US)

(*) Notice: Subject to any disclaimer, the term of this patent is extended or adjusted under 35 U.S.C. 154(b) by 1064 days.

(21) Appl. No.: 12/323,589

(22) Filed: Nov. 26, 2008

(65) Prior Publication Data

US 2010/0131640 A1 May 27, 2010

(51) Int. Cl.
G06F 15/173 (2006.01)
G06F 17/30 (2006.01)
G06Q 10/00 (2012.01)

(52) U.S. Cl.
CPC .... *G06F 17/30864* (2013.01); *G06F 17/30011* (2013.01); *G06F 17/3089* (2013.01); *G06Q 10/00* (2013.01)

(58) Field of Classification Search
CPC .............. G06Q 50/01; G06F 17/3089; G06F 17/30011; G06N 3/006
USPC .................. 709/219; 707/776–780, 723–735; 726/1–4
See application file for complete search history.

(56) References Cited

U.S. PATENT DOCUMENTS

| 6,236,987 | B1 | 5/2001 | Horowitz et al. | |
| 6,725,269 | B1* | 4/2004 | Megiddo | 709/228 |
| 7,519,562 | B1* | 4/2009 | Vander Mey et al. | 705/500 |
| 8,396,856 | B2* | 3/2013 | Jensen et al. | 707/709 |
| 2002/0174236 | A1 | 11/2002 | Mathur et al. | |
| 2003/0227487 | A1* | 12/2003 | Hugh | 345/777 |
| 2005/0108430 | A1 | 5/2005 | Howarth et al. | |
| 2005/0138033 | A1 | 6/2005 | Katta et al. | |
| 2005/0154723 | A1* | 7/2005 | Liang | 707/3 |
| 2006/0009994 | A1* | 1/2006 | Hogg et al. | 705/1 |
| 2007/0180471 | A1 | 8/2007 | Unz | |
| 2008/0109491 | A1* | 5/2008 | Gupta | 707/104.1 |
| 2008/0208714 | A1* | 8/2008 | Sundaresan | 705/27 |
| 2008/0306959 | A1* | 12/2008 | Spivack et al. | 707/9 |
| 2009/0271247 | A1* | 10/2009 | Karelin et al. | 705/10 |

OTHER PUBLICATIONS

EP Application No. 09175765.8, Extended European Search Report mailed Feb. 8, 2010, 7 pgs.
"European Application Serial No. 12182077.3, Examination Notification Art. 94(3) mailed Sep. 27, 2013", 8 pgs.
"European Application Serial No. 12182077.3, Extended European Search Report mailed Dec. 6, 2012", 8 pgs.

(Continued)

*Primary Examiner* — Chirag R Patel
(74) *Attorney, Agent, or Firm* — Schwegman Lundberg & Woessner, P.A.

(57) ABSTRACT

Techniques for identifying and linking related content are provided. A principal content network node is received having principal-defined content organized around a principal-defined topic. Local content of the principal is also acquired. The principal-defined content and the local content are evaluated to derive relationships associated with principal identities, principal reputations, and the principal-defined topic. A content network is established that links the principal content network node to other content network nodes having the local content; the links are maintained in response to the relationships.

26 Claims, 4 Drawing Sheets

(56) References Cited

OTHER PUBLICATIONS

"European Application Serial No. 12182077.3, Response filed Jan. 27, 2014 to Examination Notification Art. 94(3) mailed Sep. 27, 2013", 9 pgs.

"Mitteilung des Europaischen Patentamts vom Oct. 1, 2007 uber Geschaftsmethoden=Notice from the European Patent Office dated Oct. 1, 2007 concerning business methods=Communique de 1 'Office europeen des brevets, en date du Oct. 1, 2007", Journal Officiel De L'Office Europeen Des Brevets vol. 30, No. 11, (Nov. 1, 2007), 592-593.

* cited by examiner

TECHNIQUES FOR IDENTIFYING AND LINKING RELATED CONTENT

BACKGROUND

The Internet, the availability of broadband access to access the Internet, the ease with which content and information can be created and communicated, and the phenomenon associated with organizing in social networks to communicate over the Internet has transformed the world.

These technologies permit the sharing of ideas and the automation of manual processes beyond what anyone could have foreseen or comprehended just a few decades ago. The exponential pace with which economies and lives are evolving is staggering.

Moreover, once an individual is connected to the Internet and participating in that world community that individual is on equal footing with world leaders or the most powerful CEO's of multinational corporations. Such an individual may be odd or a social outcast, but with the power of the Internet and social networking the proclivities of that individual can be matched with others across the globe to form their own community to share and express similar ideas or concerns. Of course not all communities or individuals have noble or altruistic intents; so, along with the good that such technologies bring so comes the not so good. That is, terrorists and criminals alike can also use these forums for achieving inhumane and dangerous ends.

One continuing problem associated with content gathering, information collection, and social networking are that to a large extent individuals, governments, and enterprises have to manually seek and identify desired content and attempt to link it together for further inspection and mining. That is, there are few automated mechanisms that permit desired content to be automatically culled and linked in manners desired by users.

In fact, often a user can become inundated and desensitized by the abundance of information available on the Internet. Furthermore, one never knows whether content or information is truly reliable. All too often content can be a hoax or the identity of an author feigned to purposes of drawing in unsuspecting users to a cause or a scam. So even if a user can find desired content that user is still never really sure it is reliable and trustworthy content.

Thus what are needed are improved techniques for reliably identifying and linking related or desired content together.

SUMMARY

In various embodiments, techniques for identifying and linking related content are presented. More specifically, and in an embodiment, a method for identifying and linking related content is provided. A content network node for a principal is received, the content network node representing principal-shared content for a principal-defined topic. Next, local content is acquired from a local processing environment of the principal. Relationships are for the principal-shared content and the local content. The relationships include the principal-defined topic; one or more identities for the principal that was used to author the local content and the principal-shared content; and one or more reputation ratings assigned to the one or more identities. Finally, a content network is established having the content network node and one or more additional content network nodes that include the local content. The content network node and the other content network nodes linked in the content network via the relationships.

DETAILED DESCRIPTION

A "resource" includes a user, service, system, device, directory, data store, user, groups of users, combinations of these things, etc. A "principal" is a specific type of resource, such as an automated service or user that acquires an identity. A designation as to what is a resource and what is a principal can change depending upon the context of any given network transaction. Thus, if one resource attempts to access another resource, the actor of the transaction may be viewed as a principal.

An "agent" may be viewed as a true persona of principal. That is, an agent is a primary identity for a principal, such that the agent is permitted to manage the other identities that may be associated with principal and create new identities for the agent. Any particular assumed identity for an agent is dependent upon contexts and perhaps directions of the agent.

An "identity" is something that is formulated from a one or more identifiers and secrets that provide a statement of roles and/or permissions that the identity has in relation to resources. An "identifier" is information, which may be private and permits an identity to be formed, and some portions of an identifier may be public information, such as a user identifier, name, etc. Some examples of identifiers include social security number (SSN), user identifier and password pair, account number, retina scan, fingerprint, face scan, etc. As more and more identifiers are accumulated, a confidence in a particular identity grows stronger and stronger.

A "semantic identity" is a special type of identity that the agent can assume. Automated resources, such as services, may process the semantic identity over a network on behalf of the agent to which the semantic identity is associated. The semantic identity is confined or circumscribed to defined categories and interests identified by the agent. That is, the services that process the semantic identity over a network operate within a circumscribed semantic space of that network, where the semantic space is defined by the categories and the interests of the semantic identity.

In some cases, the semantic services may also automatically update, modify, delete, and/or add to the categories and/or interests, which are associated with the semantic identity. The services of the semantic identity use the semantic identity for mining the network within semantic identity's defined semantic space for purposes of identifying related information and/or relationships that comport with the defined categories and interests of the semantic identity. In some cases, the agent may also manually process transactions over the network as the semantic identity without the benefit of the automated semantic services.

In an embodiment, the true persona of the agent and the other identities of the agent, including the semantic identity and the true persona of the agent, may be created and managed by an identity service. Examples of some identity services, which may be modified with the teachings presented herein, may be found in U.S. Ser. No. 10/765,523, entitled "Techniques for Dynamically Establishing and Managing Authentication and Trust Relationships," filed Jan. 27, 2004; U.S. Ser. No. 10/767,884, entitled "Techniques for Establishing and Managing a Distributed Credential Store," filed Jan. 29, 2004; and U.S. Ser. No. 10/770,677, entitled "Techniques for Dynamically Establishing and Managing Trust Relationships," filed on Feb. 3, 2004. The disclosures of which are incorporated by reference herein.

In some embodiments, the areas of interest for an agent, for a category, and/or for a semantic identity are constructed as semantic abstracts and represented in a formal manner. Examples of such techniques include U.S. Ser. No. 09/615,726, entitled "A Method and Mechanism for the Creation, Maintenance and Comparison of Semantic Abstracts," filed on Jul. 13, 2000; U.S. Ser. No. 09/512,963, entitled "Construction, Manipulation, and Comparison of a Multi-Dimensional Semantic Space," filed on Feb. 25, 2000; U.S. Ser. No. 09/691,629, entitled "Method and Mechanism for Superpositioning State Vectors in a Semantic Abstract, filed on Oct. 18, 2000; and U.S. Pat. No. 6,108,619, entitled "Method and Apparatus for Semantic Characterization of General Content Streams and Repositories," issued on Aug. 22, 2000. The disclosures of which are incorporated by reference herein.

A "content node" refers to a logically organized repository that integrates related information from a centralized location for ease of access. As one example, a content node may be a web portal for a particular topic of interest. For example, a Facebook® page, a Myspace® page, a Linkedin® page, or a customized site of logically organized information around a particular topic.

The term "information" may be synonymously and interchangeably used as the term "content." Content can include text documents, instant messages, text messages, search results, Uniform Resource Locator (URL) or Uniform Resource Identifier (URI) World-Wide Web (WWW) links, images, video, graphics, audio, documents in proprietary formats (word processors, presentation services, media players, audio players, etc.), or various combinations of these things.

Various embodiments of this invention can be implemented in existing network architectures. For example, in some embodiments, the techniques presented herein are implemented in whole or in part in the Novell® network and proxy server products, distributed by Novell®, Inc., of Provo, Utah.

Of course, the embodiments of the invention can be implemented in a variety of architectural platforms, operating and server systems, or applications. Any particular architectural layout or implementation presented herein is provided for purposes of illustration and comprehension only and is not intended to limit aspects of the invention.

It is within this context that embodiments of the invention are now discussed within the context of FIGS. 1-5.

Figure 1:
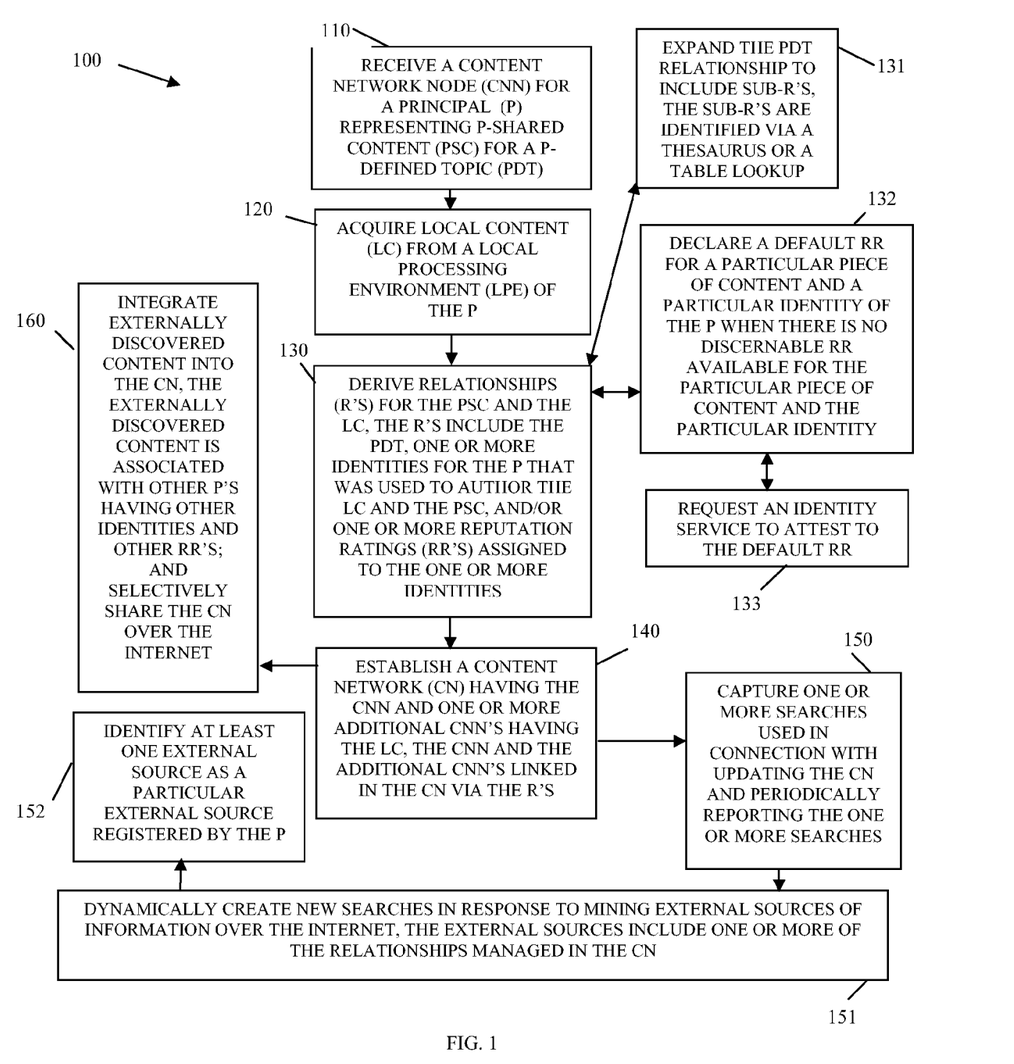
FIG. 1 is a diagram of a method for identifying and linking related content, according to an example embodiment.

FIG. 1 is a diagram of a method 100 for identifying and linking related content, according to an example embodiment. The method 100 (hereinafter "content identifying service") is implemented in a machine-accessible and computer-readable medium and instructions that execute on a processor (machine, computer, etc.). The content identifying service is operational over and processes within a network. The network may be wired, wireless, or a combination of wired and wireless.

At 110, the content identifying service receives a content network node for a principal (user, group of users, or automated service). The content node includes logical organization and linkages to principal-shared content for a particular principal-defined topic. In other words, the principal is an owner of a shared set of content that the principal adopts or permits other principals to add to and modify. That content is centrally organized as a content node that is owned and controlled by the principal, unless that principal has permitted other principals to control and own portions of the content housed or organized in the content node.

At 120, the content identifying service acquires local content from a local processing environment of the principal. Here, content that exists within the local processing environment of the principal (storage controlled by the principal and accessible to the principal via a processing device, such as a computer). The principal may flag those pieces of content that the principal does not want the content identifying service to acquire from the local processing environment of the principal. In this manner, the principal retains control over what local content, which the principal authors.

At 130, the content identifying service derives relationships for the principal-shared content and the local content. These relationships are custom defined. In some cases, policies can define the relationships. The relationships include the original principal-defined topic, one or more identities for the principal that was used by the principal to author the local content and perhaps the principal-shared content, and one or more reputation ratings assigned to the one or more identities for specific content.

Reputation ratings can take a variety of formats. For example, a particular virtual community may provide a voting mechanism that assigns a numeric, alphabetic, word, or phrase reputation rating for a given principal identity. In other cases, ratings are computed based on transactions and grades received in those transactions. The reputation rating is an objective value associated with a particular principal identity. The reputation rating for a single principal identity can vary depending upon the context. For example, a user identity for a user may be an expert and receive an "E" rating for digital photography within a digital photography virtual community and at the same time be a novice and receive an "N" rating for stock trading within an investment community. It is noted that a variety of reputation ratings can be used with the teachings presented herein. The point is that the reputation rating is an objective value associated with a community's perceived view of a particular member of that community. So, each community may include its own mechanism for assigning and managing reputations or its users that are identified within that community via a particular identifier or identity.

According to an embodiment, at 131, the content identifying service expands the principal-defined topic relationship to include a variety of sub-relationships. These sub-relationships can be automatically identified in a variety of manners, such as via a thesaurus or table lookup. So, as an example, suppose that the principal-defined topic is digital photography and a table lookup reveals an association to a sub-topic for a particular product, such as Nikon®. In fact, custom hierarchies can be used, maintained, or accessed to provide the association. This permits the principal-defined topic relationship to be expanded in automated manners.

In an embodiment, at 132, the content identifying service declares a default reputation rating for a particular piece of content and a particular identity of the principal. This is done when no existing reputation rating exists to associate with the identity and the content in question. That is there is no discernable reputation rating available for the particular piece of content and the particular principal identity associated with that content. This can occur for a variety of reasons, such as the principal is new to a group, never accessed a group, never received a rating from the group, etc.

Continuing with the embodiment at 132 and at 133, the content identifying service requests an identity service to attest to the default reputation rating that was assigned by default or that was declared as an associated reputation rating. Example types of identity services that can be modified to provide this attestation service were presented above and incorporated by reference herein. The identity service provides a level of validity to the declared reputation by vouching for that declared reputation with its reputation via the attestation. The identity service is a trusted and secure service that provides identity, security, policy, and attestation services. Multiple different identity services can interact with one another to resolve any particular attested and declared reputation rating.

At 140, the content identifying service establishes a content network having the original principal-defined content node and one or more additional content nodes. The one or more additional content nodes include the local content culled from the local processing environment of the principal. The content node and the one or more additional content nodes are linked in the content network via the relationships.

In an embodiment, at 150, the content identifying service captures one or more searches used in connection with updating the content network. The content identifying service periodically reports on these one or more searches that were successful in updating the content network. Searches can be used to automatically mine sources over the Internet to update and add to the content network. When such updates or additions occur, the searches that were used to achieve and locate the content added to the content network can be captured in an automated fashion and gathered for reporting. These reports may assist in developing still improved searches to increase the precision and accuracy of content within the content network.

Moreover, in some situations, at 151, the content identifying service dynamically creates new searches in response to mining external sources of information over the Internet. These external sources can include one or more of the relationships being managed in the content network.

Still continuing with the embodiment at 151 and at 152, the content identifying service identifies at least one external source as a particular external source that the principal manually registered with the content identifying service. So, a principal can specifically direct the content identifying service to mine external sources for updates to the content network. In some cases, these sources can be sources that do not include storage but rather use text messages and emails to disseminate to virtual community members (e.g., Twitter®, Yammer®, etc.).

In another case, at 160, the content identifying service integrates externally discovered content into the content network. The externally discovered content is associated with other identities and other reputations ratings from that which is associated with the principal. The content network can also be selectively shared over the Internet. That is, the principal or an administrator can permit the content network to become its own virtual community with specific members or principals being granted varying degrees of access to the content network. In other cases, selective portions of the content network are pushed out of the content network upon direction of the principal or policy to other principals (subscribers) or other communities. So, suppose certain searches are deemed successful in acquiring valid content related to the content network. The principal may permit these searches to be sent to subscribing Twitter® users for consumption by them. A variety of other scenarios may exist as well and are intended to fall within the generous scope of the embodiments discussed herein.

Figure 2:
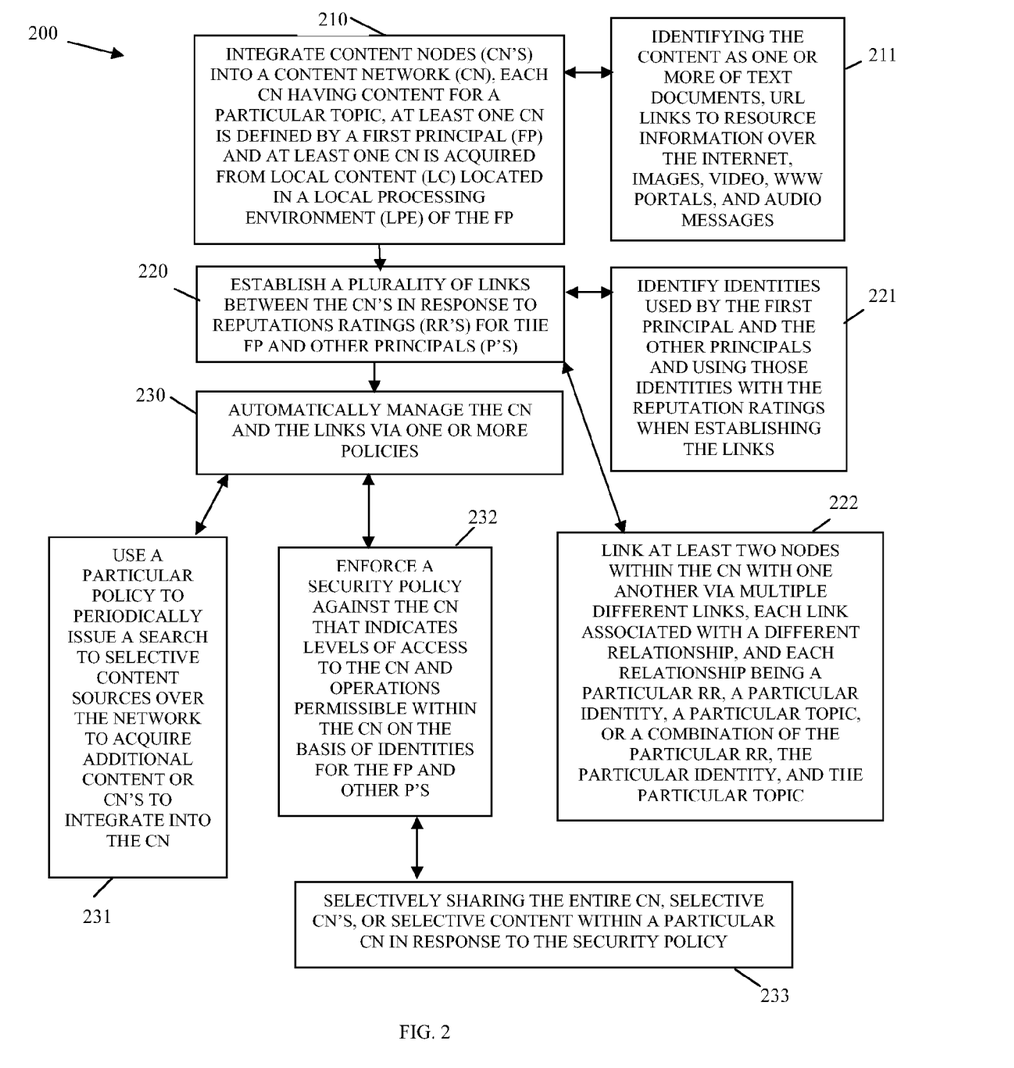
FIG. 2 is a diagram of another method for identifying and linking related content, according to an example embodiment.

FIG. 2 is a diagram of another method 200 for identifying and linking related content, according to an example embodiment. The method 200 (hereinafter "semantic content service" is implemented in a machine-accessible and computer-readable storage medium as instructions that execute on a processor and that is operational over a network. The network may be wired, wireless, or a combination of wired and wireless.

The semantic content service presents another perspective of the content identifying service represented by the method 100 of the FIG. 1 and discussed in detail above.

At 210, the semantic content service integrates content nodes into a content network. Each content node having particular content for a particular topic. Moreover, at least one of those content nodes is defined by a first and owning principal and at least another one of those content nodes is acquired from local content identified in a local processing environment of that first principal.

According to an embodiment, at 211, the semantic content service identifies the content as one or more of text documents, URL's, URI's, text messages, instant messages, images, videos, WWW portals, and/or audio messages. It is noted that this is presented as an illustration as other forms of content may be used as well, such as search criteria and other forms of metadata.

At 220, the semantic content service establishes a plurality of links between the content nodes in response to reputation ratings for the first principal and other principals that have authored content within the content network. It is noted that the first principal can have different ratings within different content nodes of the content network and the first principal can have different ratings within the same content node when that first principal is acting under the guise of multiple different identities.

In an embodiment, at 221, the semantic content service identifies identities used by the first principal and the other principals. These identities are used with the reputation ratings when establishing the links.

In another case, at 222, the semantic content service links at least two nodes within the content network via multiple different links. That is, each link is associated with a different relationship and each relationship can be defined via a single criterion or via multiple criteria. So, any combination or independent relationship can be used when establishing the two links as long as each link is different from the other. The relationships can be defined for a particular reputation rating, a particular identity, a particular topic, or combinations of these things.

It is noted that the semantic content service may also be capable of custom organizing and ranking the nodes and content within the nodes of the content network based on principal-supplied criteria. So, the principal may say organize my content by rank according to a particular topic and a particular reputation rating. Conversely, the principal may state organize the nodes and content based on a particular identity or set of identities.

At 230, the semantic content service automatically manages the content network and the links via one or more policies. That is a variety of criteria can be used and defined in policies to manage the content network.

For example, at 231, the semantic content service uses a particular policy to periodically issue a search to selective content sources over the network for purposes of acquiring additional content or content nodes to integrate within the content network. Examples of this were discussed above with reference to the method 100 of the FIG. 1.

In another example, at 232, the semantic content service enforces a security policy against the content network that indicates levels of access to the content network and operations permissible within the content network on the basis of identities for the first principal and other principals.

Continuing with the embodiment at 232 and at 233, the semantic content service selective shares the entire content network, selective content nodes, and/or selective content within a particular content network in response to the security policy.

Figure 3:
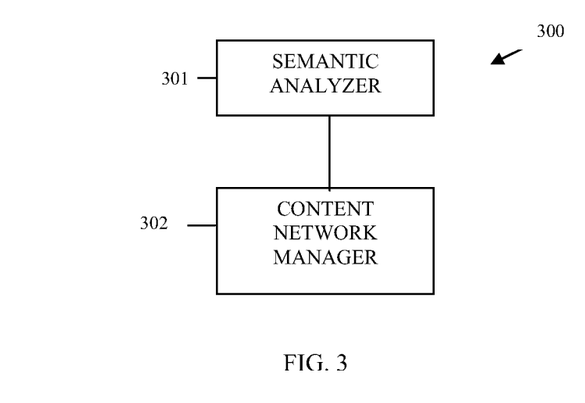
FIG. 3 is a diagram of a content identifying and linking system, according to an example embodiment.

FIG. 3 is a diagram of a content identifying and linking system 300, according to an example embodiment. The content identifying and linking system 300 is implemented in a machine-accessible and computer-readable storage medium as instructions that execute on a processor and that is operational over a network. The network may be wired, wireless, or a combination of wired and wireless. In an embodiment, the content identifying and linking system 300 implements, among other things, the content identifying service and the semantic content service represented by the methods 100 and 200 of the FIGS. 1 and 2, respectively.

The content identifying and linking system 300 includes a semantic analyzer 301 and a content network manager 302. Each of these will now be discussed in turn.

The semantic analyzer 301 is implemented in a computer-readable storage medium and executes on a processor of a machine (computer, etc.). Example aspects of the semantic analyzer 301 were discussed above with reference to the methods 100 and 200 of the FIGS. 1 and 2, respectively.

The semantic analyzer 301 derives relationships from local content included in a local processing environment of a principal. The semantic analyzer 301 provides those relationships to the content network manager 302.

According to an embodiment, the relationships include identities used by the principal and other principals for authoring the local content or specific content that is housed in the content network node.

Continuing with the previous embodiment, the relationships can also include reputation ratings for each of the identities.

Still continuing with the previous embodiment, at least one reputation rating is declared by the content network manager 302 in accordance with policy. Furthermore, the content network manager 302 has that declared reputation rating attested to by an identity service.

The content network manager 302 is implemented in a computer-readable storage medium and executes on the same processor as the semantic analyzer 301 or another entirely different processor of a network. Example processing details associated with the content network manager 302 was presented in detail above with reference to the methods 100 and 200 of the FIGS. 1 and 2, respective.

The content network manager 302 uses the relationships with a content network node, which defines a particular topic for the principal, to establish a content network for the principal. The content network includes the content network node and other content network nodes that are assembled from the local content and the content network node and other content network nodes. All the nodes are linked with one another in various combinations along with their content within the content network via the relationships.

In an embodiment, the content network manager 302 receives updated search criteria or new search criteria from an external mining service that periodically culls additional content, additional relationships, and additional content nodes for updating the content network.

In still another case, the content network manager 302 monitors additions, deletions, and updates made to the content network and supplies reports detailing activity related to updates.

Figure 4:
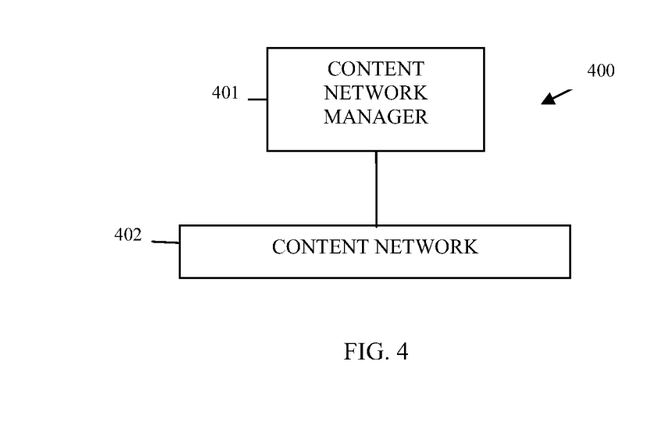
FIG. 4 is a diagram of another content identifying and linking system, according to an example embodiment.

FIG. 4 is a diagram of another content identifying and linking system 400, according to an example embodiment. The content identifying and linking system 400 is implemented in a machine-accessible and computer-readable storage medium as instructions that execute on a processor and that is accessed and processed over a network. The network may be wired, wireless, or a combination of wired and wireless. The content identifying and linking system 400 performs the processing, among other things, as depicted above with reference to the methods 100 and 200 of the FIGS. 1 and 2, respectively, and with respect to the system 300 of the FIG. 3.

The content identifying and linking system 400 includes a content network manager 401 and a content network 402. Each of these components and their interactions with one another will now be discussed in turn.

The content network manager 401 is implemented in a computer-readable storage medium and executes on a processor of a network. Example processing associated with the content network manager 401 was presented in detail above with reference to the methods 100 and 200 of the FIGS. 1 and 2, respectively, and with respect to the system 300 of the FIG. 3.

The content network manager 401 integrates multiple content nodes with one another within the content network 402. Each content node includes content. Furthermore, the content nodes are linked together within the content network 402 in response to derived relationships and at least one relationship that identifies reputation ratings for authors of the content.

In an embodiment, at least one additional relationship ties the reputation ratings to identities that are assumed for authors of the content.

Continuing with the previous embodiment, at least one author includes at least two or more different identities within the content network 402.

In a particular case, the content network manager 401 mines Internet sources for additional content to integrate within the content network 402.

In another situation related to the last embodiment, the Internet sources include virtual communities, repositories, and sharing services.

Still continuing with the prior embodiments, an owner of the content network 402 manually registers at least one sharing service with the content network manager 401.

The content network 402 is implemented in one or more storage repositories and managed via the content network manager 401, which executes on the processor.

The content network 402 includes the content nodes linked together by relationships that are managed as detailed above by the content network manager 401.

Figure 5:
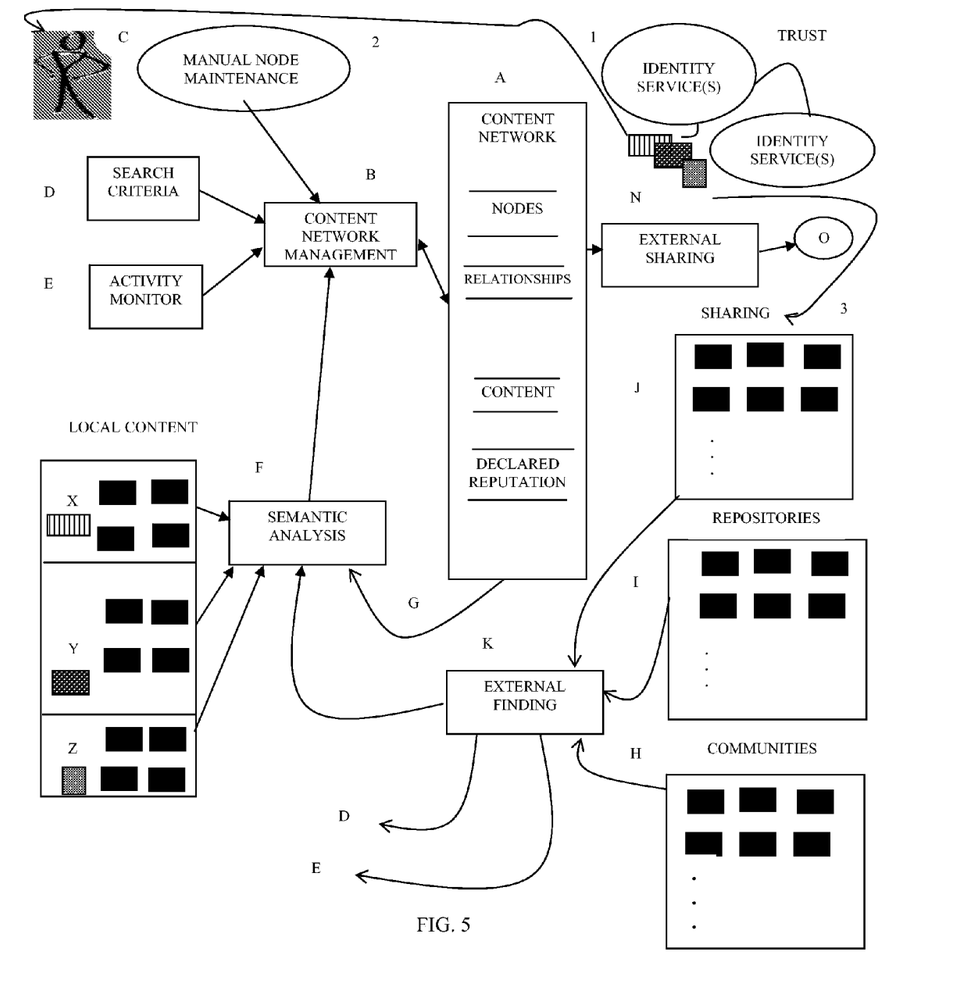
FIG. 5 is an example architecture for identifying and linking related content.

FIG. 5 is an example architecture for identifying and linking related content. The architecture can be used to implement the methods 100 and 200 of the FIGS. 1 and 2, respectively, and the systems 300 and 400 of the FIGS. 3 and 4, respectively. It is to be understood that the processing and example illustrations presented with FIG. 5 are one example implementation of the invention and that others are foreseeable and fall within the scope of the embodiments presented herein.

Identities for resources are provided (1, 2, and 3) and/or identifiers (note that an identity has stronger credentials than an identifier). These identities/identifiers are profitably used to provide an indication in a content network concerning the probable validity of acquired content/relationships.

C is used to create nodes so that the user (type of principal) can attach content/URLs/etc. to the node for later review and sharing. E is used to provide input to B (B is introduced to provide a specific mechanism for managing the Content Network, A, such as the content managers discussed above with reference to the systems 300 and 400 of the FIGS. 3 and 4, respectively).

D is used to create and maintain nodes by interrogating the search criteria and, if the user follows any of the URLs obtained by the search, the Content Network, A, is updated. D also provides a report concerning previous searches that resulted in additions or updates to the Content Network. The inclusion of content discovered during the URL access can also provide content and the URLs to F, the Semantic Analysis for further processing.

Content from URLs that are obtained from a search engine can provide a reputation of the author.

Local Content is included, which is evaluated by F, Semantic Analysis to provide new nodes, update nodes, additional content, additional relationships, etc. For example, there may be a node concerning "Digital Photography," which has relationships with nodes such as Nikon® and Cannon®. If the user is investigating the Cannon® 5D Digital SLR, Semantic Analysis creates a new node called "5D Digital SLR," which has a relationship with Cannon®, which has a relationship with Digital Photography. It is not required that each node have only one parent, indeed, most of the nodes in such a Content Network have many parents. In this example the node "5D Digital SLR" also has a relationship with "Digital Photography". Also, if the content were a review comparing the 5D with the Nikon® D200, there may be a node created by the Semantic Analysis called "Digital Photography Reviews," which would then have relationships to Cannon® and Nikon® and the camera bodies reviewed. The mechanisms for performing Semantic Analysis are varied and many are known to the art including subject discovery, summary creation, Semantic Characterization, statistical correlation, etc.

Content is also evaluated according to identity or identifiers as it is authored or created and identified as Local Content, where the content is authored by three identities (for purposes of illustration only). In this example case, the user may be authoring content under three identities (e.g., src@dakine.com, srd@dakine.com, and src@dakine.com) where each identity or identifier is participating in external conversations for some reason (e.g., different communities). This also plays into the reputation aspect for embodiments of the invention, which is disclosed above and below.

The Semantic Analysis, F, provides information to Content Network Management, B, to manage the structures in Content Network, A.

External Finding, K, (via the user's local processing environment) regularly investigates content, references, etc. from Communities (H), such as Digital Photography, Repositories such as WikiPedia, Flickr®, etc. where content concerning topics can be expected to be provided. Likewise, references and information/content may be obtained from Sharing (J), which provides information/references/content without storage (e.g., Twitter®). These sources may be registered by the user providing a specific list of sources or the sources that can be discovered during the Search Criteria and Activity Monitor and Semantic Analysis mechanisms.

Each of Sharing, Repositories, and Communities (H, I, J) may also provide reputation (reputation ratings) with the content. For example, src@dakine.com may have a high reputation in a digital photography community but only a novice reputation in an astro-photography community. In one community src@dakine.com may be considered an expert in some subject like color space management, which does not affect another community and, therefore, src@dakine.com is not highly thought of.

In some cases an identity or identifier is not known and the reputation is self asserted as is shown in A: Content Network, where Declared Reputation is provided for the External Sharing (N) mechanism to share with content from the user's Content network where the content is stored locally and not available via H, I, or J. Such a reputation may be discounted unless it is attested to by some Identity Service (or some other reputation service) that the accessing party trusts.

The user's Content Network may be shared externally with the inclusion of reputations, local content, and declared reputations.

Note that reputation is a valuable addition to the Content Network because of being able to use such a reputation to categorize and rank nodes and relationships. This also provides External Sharing (N) to provide a measure of "goodness" or validity to "O" when portions of the Content Network are shared via "O."

Note that K, External Finding, also provides input to Search Criteria and Activity Monitor, via a Semantic Analysis, as appropriate from Sharing, Repositories, and Communities. For example, using Twitter® it is possible to share one's Google searches. If one is a well respected user, others may subscribe to one's Twitter® feed and perform the same searches to gather into their own Content Network things that the well regarded user is searching. In some cases, this is done via the standard mechanism associated with the "Search Criteria" when the well respected user does not provide a Content Network. So, External Finding provides content from external sources to the Semantic Analysis for inclusion in the Content Network.

Note that the Identity Services provide identities and attestations to various aspects of the invention and such a service that may be modified to provide these services was described above and incorporated by reference herein.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method that is executed by a processor to perform:
   receiving a content network node for a principal representing principal-shared content for a principal-defined topic;
   acquiring local content from a local processing environment of the principal by excluding any pieces of content from the local processing environment that has been flagged by the principal and indicates the principal does not want those pieces of content being acquired from the local processing environment, the local processing environment is storage locally controlled by and accessible to the principal;
   deriving relationships for the principal-shared content and the local content, the relationships include the principal-defined topic, multiple identities for the principal that was used to author the local content and the principal-shared content, or one or more reputation ratings assigned to the multiple identities, wherein at least one reputation rating assigned to a particular one of the multiple identities based on a voting mechanism by a virtual community;
   establishing a content network having the content network node and one or more additional content network nodes having the local content, the content network node and the additional content network nodes linked in the content network via the relationships, wherein the virtual community is associated with the content network; and
   categorizing and ranking the content network node and the relationships using the reputation ratings.

2. The method of claim 1 further comprising, capturing one or more searches used in connection with updating the content network and periodically reporting the one or more searches.

3. The method of claim 2 further comprising, dynamically creating new searches in response to mining external sources of information over the Internet, wherein the external sources include one or more of the relationships managed in the content network.

4. The method of claim 3 further comprising, identifying at least one external source as a particular external source registered by the principal.

5. The method of claim 1, wherein deriving further includes expanding the principal-defined topic relationship to include sub-relationships, wherein the sub-relationships are identified via a thesaurus or a table lookup.

6. The method of claim 1, wherein deriving further includes declaring a default reputation rating for a particular piece of content and a particular identity of the principal when there is no discernable reputation rating available for the particular piece of content and the particular identity.

7. The method of claim 6, wherein declaring further includes requesting an identity service to attest to the default reputation rating as an associated reputation rating.

8. The method of claim 1 further comprising:
   integrating externally discovered content into the content network, wherein the externally discovered content is associated with other principals having other identities and other reputation ratings; and
   selectively sharing the content network over the Internet.

9. A method that is executed by a processor to perform:
   integrating content nodes into a content network, each content node having content for a particular topic, wherein at least one content node is defined by a first principal and at least one content node is acquired from local content located in a local processing environment of the first principal, the local processing environment is storage locally controlled by and accessible to the first principal;
   establishing a plurality of links between the content nodes in response to reputations ratings for the first principal and other principals and discounting at least one reputation rating discounted within the content network until that reputation rating is attested to by an identity service, and wherein at least one reputation rating assigned to the first principal based on a voting mechanism by a virtual community associated with the content network;
   custom organizing and ranking the content nodes and content within the content nodes based on principal-supplied criteria, and wherein custom organizing and ranking further includes categorizing and ranking the content nodes and relationships defined the links using the reputation ratings; and
   automatically managing the content network and the links via one or more policies.

10. The method of claim 9, wherein integrating further includes identifying the content as one or more of text documents, Uniform Resource Locator (URL) links to resource information over the Internet, images, video, World-Wide Web portals, and audio messages.

11. The method of claim 9, wherein establishing further includes identifying identities used by the first principal and the other principals and using those identities with the reputation ratings when establishing the links.

12. The method of claim 9, wherein establishing further includes linking at least two nodes within the content network with one another via multiple different links, each link associated with a different relationship, and each relationship being a particular reputation rating, a particular identity, a particular topic, or a combination of the particular reputation rating, the particular identity, and the particular topic.

13. The method of claim 9, wherein automatically managing further includes using a particular policy to periodically issue a search to selective content sources over the network to acquire additional content or content nodes to integrate into the content network.

14. The method of claim 9, wherein automatically managing further includes enforcing a security policy against the content network that indicates levels of access to the content network and operations permissible within the content network on the basis of identities for the first principal and other principals.

15. The method of claim 14 further comprising, selectively sharing the entire content network, selective content nodes, or selective content within a particular content node in response to the security policy.

16. A processor-implemented system, comprising:
    a processor configured with a semantic analyzer implemented in a non-transitory computer-readable storage medium and to execute on the processor; and
    the processor or another processor of the network configured with a content network manager implemented in a non-transitory computer-readable storage medium and to execute on the processor or another processor of a network;
    wherein the semantic analyzer derives relationships from local content included in a local processing environment of a principal and provides those relationships and local content to the content network manager, the local content acquired from a local processing environment of the principal and excludes pieces of content that were flagged by the principal indicating the principal does not want those pieces of content acquired, the local processing environment is storage controlled by the principal and accessible locally to the principal, the content network manager uses the relationships with a content network node defining a particular topic for the principal to establish a content network for the principal, the content network having the content network node and other content network nodes assembled from the local content and the content network node and the other content network nodes linked within the content network via the relationships, and the relationship includes multiple principal identities used by the principal, and wherein the relationships further include reputation ratings for each of the identities, and wherein at least one reputation rating assigned to a particular one of the multiple principal identities based on a voting mechanism by a virtual community, wherein the content network nodes and the relationships are categorized and ranked using the reputation ratings.

17. The system of claim 16, wherein the relationships include identities used by the principal and other principals for authoring the local content or specific content housed in the content network node.

18. The system of claim 16, wherein a particular reputation rating is declared by the content network manager in accordance with policy and the content network manager has that declared reputation rating attested to by an identity service.

19. The system of claim 16, wherein the content network manager receives updated search criteria or new search criteria from an external mining service that periodically culls additional content, additional relationships, and additional content nodes for updating to the content network.

20. The system of claim 16, wherein the content network manager monitors additions, deletions, and updates made to the content network and supplies reports detailing activity related to updates.

21. A processor-implemented system, comprising:
a processor of a network configured with a content network manager implemented in a non-transitory computer-readable storage medium and to execute on the processor of the network; and
the processor also configured to access a content network implemented in one or more non-transitory storage repositories and managed via the content network manager that executes on the processor;
wherein the content network manager integrates multiple content nodes, each of which have content, together within the content network, and wherein the content nodes are linked in response to derived relationships and at least one relationship identifies reputation ratings for authors of the content and the content nodes, each content node associated with a particular topic within the content network, and the content is custom organized and ranked within the content network based on principal-supplied criteria received from a principal, and each content node having content that is culled from each principal having local content in a local processing environment of that principal controlled locally by the principal and that participates in the content network where each principal identifies specific content that is not to be shared from that principal's local processing environment and wherein at least one reputation rating is discounted within the content network until that reputation rating is attested to by an identity service, and wherein a particular one of the reputation ratings assigned to a particular principal based on a voting mechanism by a virtual community associated with the content network, and wherein the content nodes and the relationships are categorized and ranked using the reputation ratings.

22. The system of claim 21, wherein at least one additional relationship ties the reputation ratings to identities assumed for the authors.

23. The system of claim 22, wherein at least one author includes at least two different identities within the content network.

24. The system of claim 20, wherein the content network manager mines Internet sources for additional content to integrate into the content network.

25. The system of claim 24, wherein the Internet sources include virtual communities, repositories, and sharing services.

26. The system of claim 25, wherein an owner of the content network manually registers at least one sharing service with the content network manager.

* * * * *